Sept. 27, 1955      T. F. BANIGAN      2,719,100
PROCESS OF HEAT-SEALING TENSILIZED THERMOPLASTIC FILMS
Filed March 24, 1952
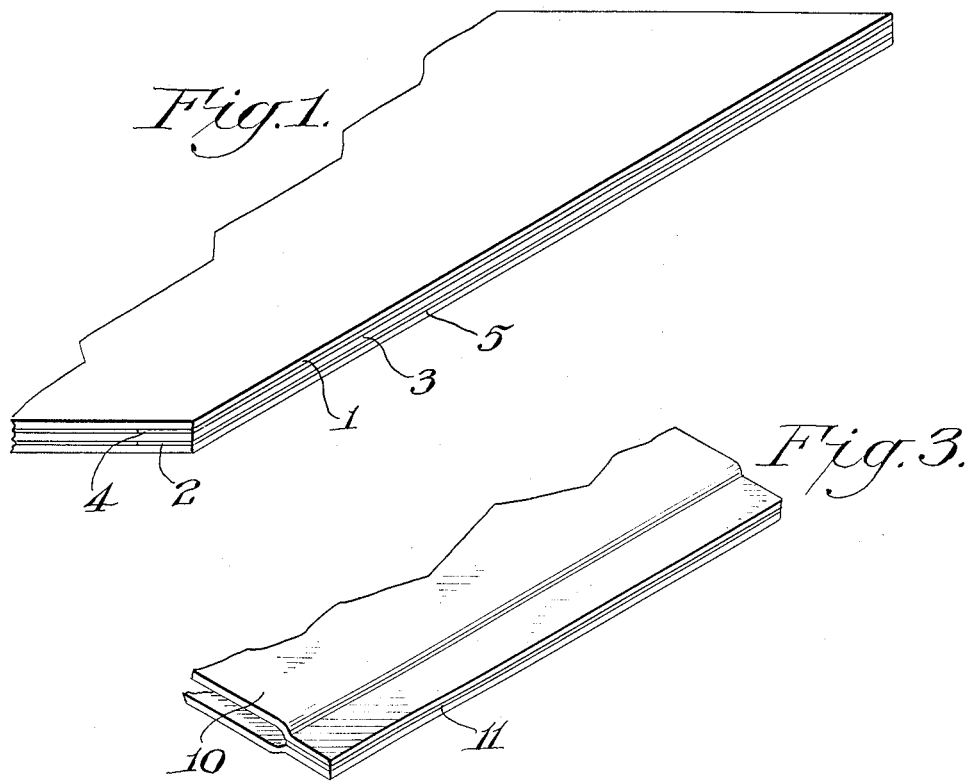
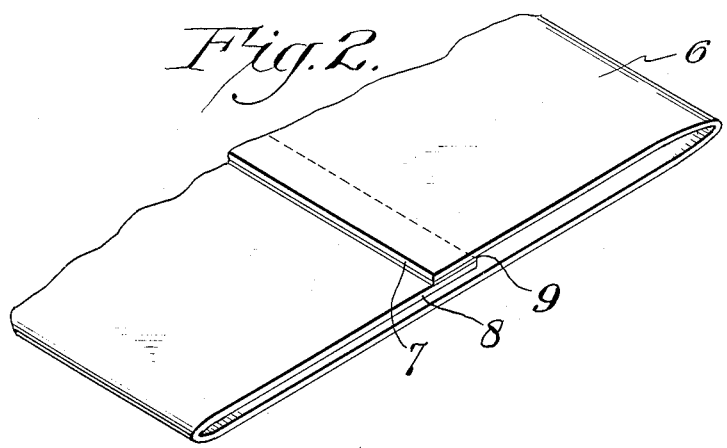
INVENTOR:
Thomas F. Banigan
BY
C. Ralph Snyder
ATTORNEY.

_United States Patent Office_

2,719,100
Patented Sept. 27, 1955

2,719,100

PROCESS OF HEAT-SEALING TENSILIZED THERMOPLASTIC FILMS

Thomas Franklin Banigan, Kenmore, N. Y., assignor to E. I. du Pont de Nemours and Company, Wilmington, Del., a corporation of Delaware Application March 24, 1952, Serial No. 278,247

6 Claims. (Cl. 154—116)

This invention relates to a process of heat-sealing homogeneous thermoplastic films and, more particularly, to a process of heat-sealing or laminating tensilized thermoplastic films at temperatures normally used for sealing untensilized films.

When attempting to heat-seal, or bond together through the agency of heat, a tensilized (i. e., stretched in one or more directions), thermoplastic film, the film shrinks or retracts in the heated area and the resulting heat-seal is usually puckered; and, depending upon the film composition, the seal may be brittle and/or opaque. Furthermore, the film may tear at the seal as it shrinks. Another disadvantage encountered in heat-sealing tensilized films is that temperatures above normal heat-sealing temperatures employed in sealing untensilized thermoplastic films are required to effect even an unsatisfactory seal between layers of tensilized film. For example, whereas unstretched polyethylene terephthalate film is heat-sealable at temperatures of from 150°–170° C., heat-sealing temperatures in the neighborhood of 235°–245° C. are required for sealing biaxially oriented polyethylene terephthalate film stretched three times (3X) in both directions and heat-set (i. e., subjected to heat of from 150°–200° C. while under tension); and the resulting heat-seals are puckered, embrittled and somewhat opaque, and, hence, are not acceptable for commercial packaging. The same difficulties occur in heat-sealing other types of tensilized polymeric films, such as tensilized polyvinylidene chloride and rubber hydrochloride films.

An object of the present invention, therefore, is to provide a process for satisfactorily heat-sealing, or bonding together through the influence of heat, tensilized thermoplastic polymeric films. A further object is to provide a process for heat-sealing such films at heat-sealing temperatures normally used for sealing untensilized thermoplastic polymeric films. A more specific object is to provide a process of heat-sealing tensilized polyethylene terephthalate film at normal heat-sealing temperatures. Other objects will be apparent to those skilled in the art.

The above objects are accomplished according to the present invention by interposing a substantially noncrystalline (amorphous), untensilized thermoplastic polymeric film between adjacent layers of tensilized thermoplastic polymeric film to be heat-sealed, the untensilized film being of substantially the same composition as the tensilized film, and thereafter applying heat at normal heat-sealing temperatures, not above about 170° C., over the resulting composite in the areas where a seal is desired.

By the expression, "substantially the same composition," used herein to define the untensilized film, is meant that the amorphous untensilized film must be comprised of at least 50% of the polymer of the tensilized polymeric films being heat-sealed. This requirement may be fulfilled by employing an amorphous untensilized film comprised of a copolymer containing at least 50% of the polymer forming a major portion of the composition of the tensilized film, or the amorphous untensilized film may be comprised of a mixture of polymers made up of at least 50% of the polymer of the tensilized film. Generally, poor bond strengths are obtained with heat-seals made using an interposed amorphous untensilized film which is not chemically similar to the tensilized films being sealed.

An amorphous film of polyethylene terephthalate, polyvinylidene chloride, rubber hydrochloride, or like thermoplastic polymer may be prepared by extruding the molten polymer into film form and immediately thereafter quenching the film to reduce its temperature to room temperature. The rate of crystallization of an amorphous unstretched film of one of the above polymers at room temperature is low. After standing at room temperature for long periods, some amount of crystallization does take place; but the film is substantially noncrystalline. On the other hand, the rate of crystallization of a one-way or biaxially stretched film at room temperature is appreciably greater; and when polyethylene terephthalate film and films of the other polymers mentioned above are stretched at elevated temperatures, they are crystalline. Generally, the degree of crystallization depends mainly upon the extent of stretch, temperature to which film is exposed, and duration of exposure.

In sealing thin films, i. e., less than 0.0003" in thickness, of tensilized polyethylene terephthalate, it is usually preferred to employ an amorphous untensilized film which seals to itself or softens at relatively lower temperatures, i. e., 140°–150° C. This produces stronger seals with thin films which are generally used in light packaging applications. Generally, in so-called light packaging applications, the packaged material is light in weight and because of the fragileness of the contents of the package, the bag or wrapping itself will not be subjected to extreme physical conditions.

Generally, the optimum heat-sealing temperatures will vary with the type of amorphous untensilized film employed. Furthermore, the magnitude of stretch (in one or both directions), the thickness of the tensilized film, and the temperature at which the tensilized film is heat-set, and the degree of crystallization, influence the temperature at which a strong heat-seal may be made. Those tensilized films which are stretched 3X or more in both directions and are heat-set at temperatures in the neighborhood of 200° C. require somewhat higher heat-sealing temperatures than those films which are stretched to a lesser degree and are heat-set at somewhat lower temperatures. As the thickness of the film increases, the required heat-sealing temperature increases. In no event, however, will a temperature substantially in excess of 170° C. be required to effect a strong heat-seal.

The process of this invention may be employed wherever it is desired to bond together or heat-seal tensilized thermoplastic polymeric films. Following are some of the typical applications, reference being had to the accompanying drawing wherein:

Figure 1 is a fragmentary perspective of a laminated structure;

Figure 2 is a fragmentary perspective of a tubing seal; and

Figure 3 is a fragmentary perspective of a bag seal.

Referring now to Figure 1, a multiplicity of tensilized polyethylene terephthalate films are laminated to form a thicker homogeneous film by interposing sheets 2 and 4 of substantially noncrystalline untensilized polyethylene terephthalate film between adjacent sheets 1, 3, and 5 of the tensilized film, and thereafter applying heat at 150°–170° C. and slight pressure in the neighborhood of 20 pounds per square inch or less over the entire surface area of the composite to form a uniform seal between the sheets of tensilized films. This sealing process may be carried out on a continuous basis (because of the light pressure and moderate temperatures which may be used) by continuously feeding a composite of alternate layers of tensilized and untensilized films into a zone of heat and light pressure. The resulting laminated sheet possesses properties substantially equivalent to the excellent mechanical properties of a tensilized homogeneous film of substantially the same caliper. In this regard, it is important to point out that it is relatively difficult to produce a tensilized (biaxially oriented, stretched 3X in both directions) film of polyethylene terephthalate having a thickness substantially greater than 0.007″ in a continuous type of stretching apparatus. This is evident from the fact that the amorphous initial sheet prior to stretching must be about 0.063″ in thickness, and the work required to stretch the film 3X biaxially is excessive for continuous economical operation.

In Figure 2, tensilized, thermoplastic polymeric film, the heat-seal-bond strength. Examples 1 and 2 represent the control tests wherein no interposed film was employed. As indicated, no seal was effected by applying the heat-sealing bar to seal two sheets of tensilized polyethylene terephthalate at 160° C. In Example 1, the tensilized film was not sized; and in Example 2, the tensilized film was sized with a dilute aqueous dispersion of a wetting agent, a wax and salt such as sodium chloride. The tensilized films of Examples 4 and 5 were sized with the above mentioned composition. In Examples 7, 8, 10, 11, 13, and 15, inclusive, the untensilized film was prepared from a copolyester made from ethylene glycol and 60 mol percent of terephthalic acid and 40 mol percent of sebacic acid. The untensilized film of Examples 3–6, inclusive, 9, 12 and 14 was prepared from amorphous polyethylene terephthalate. In each instance, the seal obtained was smooth, and the transparency of the film was unimpaired.

| Example | Film Being Sealed | Film Thickness (Inches) | Sealing Strip | Strip Thickness (Inches) | Heat-Sealing Temp. (at 20 p. s. i. in 2 Seconds Dwell Time) ° C. | Seal Strength [1] grams Suter Tester |
|---|---|---|---|---|---|---|
| 1. (Control) | Poly. tere. stretched 3X biaxially and heat-set at 150° C. | 0.001 | | | 160 | No seal. |
| 2. (Control) | ----do---- | 0.001 | | | 160 | Do. |
| 3 | ----do---- | 0.001 | Amorphous Poly. tere. | 0.001 | 160 | 1,070. |
| 4 | ----do---- | 0.001 | ----do---- | 0.001 | 160 | 920. |
| 5 | ----do---- | 0.001 | ----do---- | 0.001 | 160 | 600. |
| 6 | ----do---- | 0.001 | ----do---- | 0.001 | 150 | 450. |
| 7 | Poly. tere. stretched 3X biaxially and heat-set at 200° C. | 0.00025 | Copolyester | 0.001 | 150 | 1,150. |
| 8 | ----do---- | 0.00025 | ----do---- | 0.001 | 170 | 1,349. |
| 9 | ----do---- | 0.00025 | Amorphous Poly. tere. | 0.001 | 170 | 295. |
| 10 | ----do---- | 0.00025 | Copolyester | 0.001 | 150 | 1,088. |
| 11 | ----do---- | 0.00025 | ----do---- | 0.001 | 170 | 1,988. |
| 12 | ----do---- | 0.001 | Amorphous Poly. tere. | 0.001 | 160 | 309. |
| 13 | ----do---- | 0.001 | Copolyester | 0.001 | 160 | 1,572. |
| 14 | ----do---- | 0.002 | Amorphous Poly. tere. | 0.001 | 170 | 503. |
| 15 | ----do---- | 0.002 | Copolyester | 0.001 | 170 | 2,048. |

[1] For light packaging applications a seal strength of 200 grams is satisfactory.

e. g., tensilized polyethylene terephthalate film, is formed into a tubing 6 by interposing between overlapping edges 7 and 8, a narrow strip 9 of substantially noncrystalline, untensilized polyethylene terephthalate film and lightly pressing a heated sealing bar over the resulting composite area to form a longitudinal heat-sealed seam.

In Figure 3, a bag 10 of tensilized, thermoplastic polymeric film, such as tensilized polyethylene terephthalate film, is end-closed by inserting a narrow strip 11 of untensilized polyethylene terephthalate film between the opposed edges at the open end of the bag and pressing the edges together between the elements of a conventional heat-sealing iron heated to a temperature between 150° and 170° C.

The following examples of preferred embodiments will further serve to illustrate the principles and practice of the present invention.

These examples are summarized in the following table which tabulates the pertinent data relating to the thicknesses of the tensilized and untensilized films, heat-sealing temperatures and strength of seal. In all cases, strips of noncrystalline untensilized polymeric film were interposed between sheets of tensilized polyethylene terephthalate; and a sealing bar of a precision heat-sealer (sealing surface was coated with polytetrafluoroethylene) was applied over the surface of the composite (as defined by the strips) to heat-seal the two sheets of tensilized polymeric film together. The heat-sealing pressure in all cases was 20 pounds per square inch, and the time of dwell was 2 seconds. Test samples 1½″ wide were cut from the sealed sheets, and the free ends of the sealed strips were pulled apart in a stretching device such as a Suter tester by gripping each end of the sheet in a suitable clamp, one of which is fixed while the other is moved away at a constant speed of 12″ per minute. The force in grams required to pull the sheets apart is taken as a measure of

*Example 16*

Continuous films of tensilized (stretched 3X biaxially and heat-set at 200° C. for 1–2 minutes) polyethylene terephthalate film (0.003″ in thickness) were continuously laminated together by interposing a continuous film of amorphous and unstretched polyethylene terephthalate film (0.003″ in thickness) between the tensilized films and passing the resulting composite between stainless steel mill rolls maintained at 150° C. The lamination was excellent, and the resulting laminate had the appearance of a homogeneous film. After exposing the laminated film to 175° C. for 500 hours, there was no evidence of delamination.

An alternate method of placing an untensilized thermoplastic film between the surfaces of a tensilized film is to cast a film directly on the surface of a tensilized film by applying a solvent solution of a polymer of substantially the same composition as that of the tensilized film. For example, two solvent solutions of a copolyester of 60 mol percent terephthalic acid and 40 mol percent of sebacic acid with ethylene glycol were prepared. The copolyester was dissolved in dioxane and also in acetone. The two different solutions (approximately 5% solids) were applied to the surfaces of two different tensilized polyethylene terephthalate films (stretched 3X biaxially and heat set at 150–200° C.) with a brush and the solvent was allowed to evaporate. Thereafter, a second sheet of tensilized polyethylene terephthalate film was placed over the thin film of copolyester cast on each of the tensilized films, and heat seals were made using an impulse type sealer at a temperature within the range 150–170° C. The copolyester applied from the dioxane solution was found to give a somewhat stronger bond than that in which acetone was used. However, both seals were very strong, i. e., 900 grams to 1500 grams.

The above procedure may also be employed to cast a film of amorphous polyethylene terephthalate onto the surface of a tensilized film of polyethylene terephthalate, but the number of suitable solvents which may be employed are limited. Solvents which may be employed are tetrachloroethane and a 7:10 mixture of phenol and trichlorophenol. In most cases, however, suitable solvents for polyethylene terephthalate are highly toxic, and the preferred process of the present invention is to employ preformed film of amorphous untensilized material in accordance with the procedure described in the foregoing examples.

In the sealing process of the present invention it is to be understood that the actual temperature of the film being sealed should not exceed 170° C. In the specific examples presented herein the dwell times are relatively long, e. g., 1–2 seconds. In many commercial heat sealing apparatus the dwell time is less than one second. Therefore, the actual temperature of the heat sealing bar may appreciably exceed 170° C., but in no case should the actual film temperature exceed 170° C.

It is to be understood that the foregoing examples are merely illustrative and that the present invention is applicable to tensilized, thermoplastic polymeric films in general. In addition to polyethylene terephthalate, one may heat-seal or laminate in the same fashion and with the same advantageous results, films of polyvinylidene chloride, rubber hydrochloride and polyvinyl fluoride.

I claim:

1. The process for bonding together biaxially oriented, heat-set polyethylene terephthalate film which comprises placing between surfaces of biaxially oriented, heat-set polyethylene terephthalate film to be joined, untensilized amorphous polyethylene terephthalate film coextensive with the area to be joined, and subjecting the composite so formed to slight pressure and heat at normal heat-sealing temperatures not substantially above 170° C., whereby to bond the surfaces of biaxially oriented, heat-set film to the adjoining surface of untensilized amorphous film.

2. The process of claim 1 wherein the biaxially oriented film is stretched three times.

3. The process of heat-sealing adjoining surfaces of biaxially oriented, heat-set polyethylene terephthalate film which comprises inserting between said surfaces a strip of untensilized amorphous polyethylene terephthalate film and applying pressure and heat at normal heat-sealing temperatures not substantially above 170° C. to the resulting composite, whereby to seal the films together.

4. A laminated structure comprising untensilized amorphous polyethylene terephthalate film, heat-sealed on both surfaces to biaxially oriented, heat-set polyethylene terephthalate films.

5. The process for bonding together biaxially oriented, heat-set polyethylene terephthalate film which comprises placing between surfaces of biaxially oriented, polyethylene terephthalate film heat-set at a temperature between 150°–200° C., untensilized amorphus polyethylene terephthalate film coextensive with the area to be joined, and subjecting the composite so formed to slight pressure and heat at normal heat-sealing temperatures not substantially above 170° C., whereby to bond the surfaces of biaxially oriented, heat-set film to the adjoining surface of untensilized amorphous film.

6. A laminated structure comprising untensilized amorphous polyethylene terephthalate film, heat-sealed on both surfaces to biaxially oriented, polyethylene terephthalate films which have been heat-set at a temperature between 150° and 200° C.

References Cited in the file of this patent

UNITED STATES PATENTS

| | | |
|---|---|---|
| 2,259,347 | Mallory | Oct. 14, 1941 |
| 2,497,376 | Swallow et al. | Feb. 14, 1950 |
| 2,594,229 | Snyder et al. | Apr. 22, 1952 |